(12) United States Patent
Sugihara et al.

(10) Patent No.: US 8,092,011 B2
(45) Date of Patent: Jan. 10, 2012

(54) EYEGLASS-MOUNTED TYPE IMAGE DISPLAY DEVICE

(75) Inventors: Ryohei Sugihara, Machida (JP); Seiji Tatsuta, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 119 days.

(21) Appl. No.: 12/729,748

(22) Filed: Mar. 23, 2010

(65) Prior Publication Data
US 2010/0245756 A1   Sep. 30, 2010

(30) Foreign Application Priority Data
Mar. 25, 2009 (JP) ................. 2009-074910

(51) Int. Cl.
*G02C 1/00* (2006.01)
(52) U.S. Cl. ........................ 351/158; 359/630
(58) Field of Classification Search .............. 351/41, 351/158; 359/629, 630
See application file for complete search history.

(56) References Cited

U.S. PATENT DOCUMENTS

| 6,023,372 A * | 2/2000 | Spitzer et al. ................. 359/630 |
| 7,843,403 B2 * | 11/2010 | Spitzer .............................. 345/7 |

FOREIGN PATENT DOCUMENTS

| JP | 2001-066544 | 3/2001 |
| JP | 2003-502713 | 1/2003 |
| JP | 2005-352024 | 12/2005 |
| JP | 3871188 | 10/2006 |

OTHER PUBLICATIONS

WO 00/79329 A1, dated Dec. 28, 2000 (Abstract only).
WO 99/23525, dated May 14, 1999 (Abstract only).

* cited by examiner

*Primary Examiner* — Huy K Mai
(74) *Attorney, Agent, or Firm* — Scully, Scott, Murphy & Presser, P.C.

(57) ABSTRACT

An eyeglass-mounted type image display device suggested by the present invention is applicable to an existing pair of eyeglasses and includes an image display unit having an image display panel and attachable and detachable to and from an eyeglass temple and a light guiding unit that exits the image light emitted from the image display panel of the image display unit toward an eyeball of an observer through an entering end, an optical path and an exit end is provided, wherein the light guiding unit is provided separately from the image display unit.

4 Claims, 8 Drawing Sheets

EYEGLASS-MOUNTED TYPE IMAGE DISPLAY DEVICE

CROSS-REFERENCE TO RELATED APPLICATION

The present application claims priority from Japanese Application No. 2009-074910 filed on Mar. 25, 2009, the content of which is incorporated herein by reference.

FIELD OF THE INVENTION

The present invention relates to an eyeglass-mounted type image display device that can be applied to an existing pair of eyeglasses easily without interfering with folding of a temple.

BACKGROUND OF THE INVENTION

In the eyeglass-mounted type image display device, the image light emitted from an image display unit (unit body part) that is attached to a temple part of a pair of eyeglasses is incident on an eyeball of an observer through a light guiding unit, thereby enabling the image light to be observed as an image. As the conventional art with respect to this point, for example, JP 2005-352024 A suggests an eyeglass type interface device, in which a camera unit for taking an image of an amphiblestrode of the eyeball of the user and outputting an imaging signal thereof, a wireless communication unit for transmitting the imaging signal from the camera unit through radio waves and a power generating unit for supplying electrical power to the camera unit and the wireless communication unit are mounted respectively on the pair of eyeglasses for integration.

Further, as other conventional eyeglass-mounted type image display devices, various types of devices have been suggested so far. For example, JP 3871188 B2 suggests an eyeglass-mounted type image display device having a structure in which a housing assembly that contains a circuit configuration for receiving data or image that is relayed to the display device is mounted on an eyeglass temple of the user by a clamping assembly which clamps the housing assembly to a fitting, JP 2001-66544 A suggests a structure in which a display means for displaying image and a light bending element are mounted on an eyeglass frame, or JP 2003-500711 A suggests a structure in which a display and an eyepiece lens assembly are supported by an optical mechanical type support fitting and the image from the display is received by the eyepiece lens assembly.

However, the conventional image display devices of the aforementioned types have problems such as, for JP 2005-352024 A, an optical unit is embedded in a lens part of a pair of eyeglasses, therefore an existing pair of eyeglasses cannot be used, for JP 3871188 B2, even if an optical unit has a foldable structure, folding work of the optical unit is required separately from the folding work of a temple, which causes unavoidable troublesome works for housing, for JP 2001-66544 A, since a root of an eyeglass lens is provided with a hinge for folding a temple, an optical unit may hit a nose pad and the like when the temple is folded, and further, for JP2003-502713A, since an optical unit remains in the same attitude when a temple is folded (folding cannot be performed), a part thereof projects from an pair of eyeglasses, thereby not allowing housing in a compact state. Thus there is still room for improvement.

The object of the present invention is to suggest an eyeglass-mounted type image display device that enables easy application to an existing pair of eyeglasses and a temple to be folded without the obstruction by an image display unit (an optical unit part).

SUMMARY OF THE INVENTION

An eyeglass-mounted type image display device according to the present invention includes an image display unit having an image display panel and is attachable and detachable to and from an eyeglass temple and a light guiding unit that exits an image light emitted from the image display panel toward an eyeball of an observer through an entering end, an optical path and an exit end, wherein the light guiding unit is constituted as a separate body that is disposed on an outer surface of an eyeglass lens separated from the image display unit.

In the aforementioned structure, it is preferable that the image display panel is located closer to the eyeglass lens side than a hinge unit, which is a base point of folding of the temple. In addition, it is preferable that a mounting area of the image display panel is located backward of the eyeglass lens and a position thereof in the up and down direction is, when viewed from front of the pair of eyeglasses, lower or upper side of an endpiece that connects the temple to an eyeglass frame, the lower limit or the upper limit thereof is a lower edge or an upper edge of the lens, and a position thereof in the width direction is from the temple to the edge in the width direction of the lens. More specifically, it is preferable that the mounting area of the image display panel is located backward of the eyeglass lens and should be, when viewed from front of the pair of eyeglasses, an area surrounded by the endpiece that connects the temple with the eyeglass frame, an outer edge of the eyeglass lens in the width direction, a virtual vertical line that extends along the outer edge of the eyeglass lens in the width direction on the outside end of the temple, and a virtual horizontal line that connects the virtual vertical line to the lowermost edge or the uppermost edge of the eyeglass lens. Further, it is preferable that the light guiding unit is disposed so that the image light emitted from the image display panel is incident on the entering end after passing the lateral outer side of the eyeglass lens and the image light that exits from the exit end transmits the eyeglass lens and is incident on the eyeball of the observer.

Since the device has a separate structure in which the image display unit having the image display panel is mounted on the eyeglass temple, and the light guiding unit that guides the image light emitted from the image display panel to the eye of the observer is mounted on the eyeglass lens, the image display unit and the light guiding unit may not be obstruction when the temple is folded, thereby enabling one-touch folding and easy application to an existing pair of eyeglasses.

When mounting the image display unit on the temple, the image display panel disposed in the image display unit is located closer to the eyeglass lens than the hinge unit, which is a base point of folding of the temple, thereby the distance between the image display panel and the entering end of the light guiding unit can be shortened. Thus smaller display panels can be applied (or an angle of view can be increased).

Since the image display unit is mounted on the temple, it is not necessary to provide a cable and the like to send power or signal to the hinge unit even if the image display panel embedded in the image display unit is located closer to the eyeglass lens than the hinge unit.

The image display panel of the image display unit is disposed backward of the lens and is located in an area surrounded by the eyeglass endpiece (a member that is integrated with the eyeglass frame and connects the frame to the temple), the outer edge of the eyeglass lens in the width direction, a vertical line extending along the outer edge of the eyeglass lens in the width direction at the outside end of the temple and a horizontal line that connects the vertical line and the lowermost or the uppermost edge of the eyeglass lens, thereby reducing projection from top, bottom, left and right sides, which will not block the view of an observer when he/she wears a pair of eyeglasses (will be less likely to obstruct) and, in addition the aesthetic loock is not impaired.

The light guiding unit is disposed so that the image light emitted from the image display panel passes the lateral outer side of the eyeglass lens and is incident on the entering end, and the image light that exists from the exit end transmits the eyeglass lens and is incident on an eyeball of an observer, thereby preventing the image quality from being deteriorated and, in addition elmininating an adjusting mechanism of eyepiece visibility. (When the image light transmits the eyeglass lens and is incident on the entering end of the light guiding unit, the image quality of the image that is displayed is deteriorated because there are various kinds of eyeglass lenses. On the other hand, in the case where the imgae light that exits from the exit end of the light guiding unit does not transmit the lens and is incident on the eyeball of the observer, it is necessary to provide an adjusting mechanism of eyepiece visibility separately since the image that is displayed cannot be viewed with an corrected eyesight.)

DESCRIPTION OF THE PREFERRED EMBODIMENTS

Figure 1:
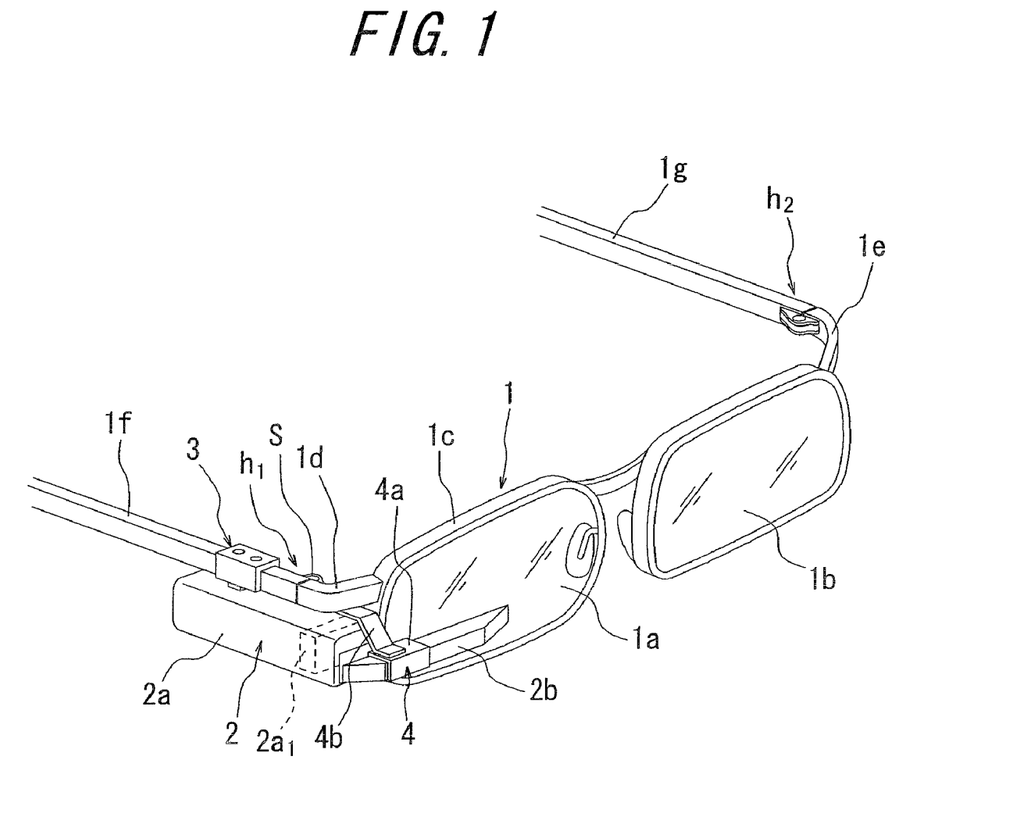
FIG. 1 is an appearance perspective view showing a state in which an eyeglass-mounted type image display device according to the present invention is mounted on an existing pair of eyeglasses.
Figure 2:
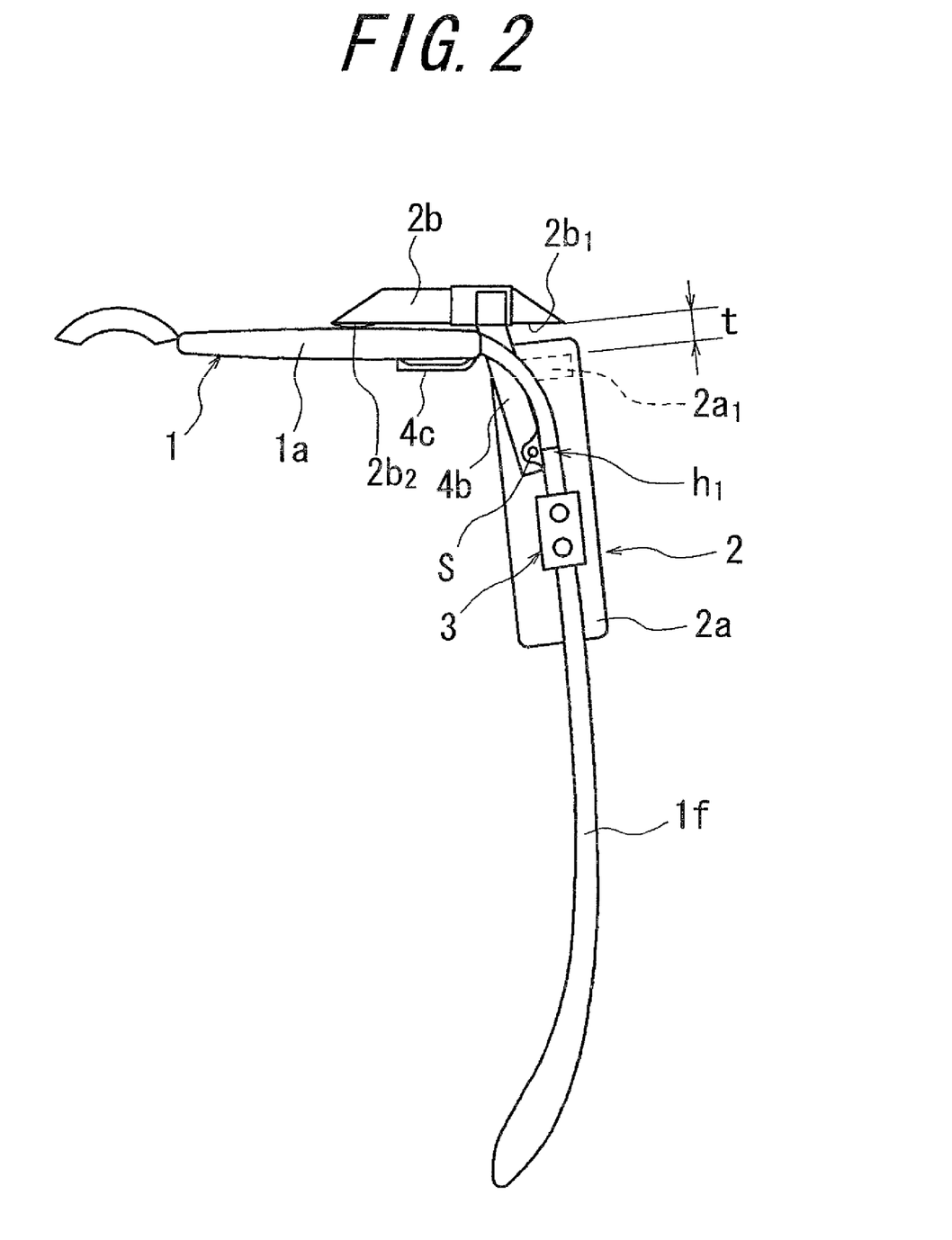
FIG. 2 is a diagram showing right half of plane of FIG. 1.

The present invention is concretely illustrated below with reference to the drawings. FIG. 1 is an appearance perspective view (a right-eye type) exemplarily showing an embodiment of the image display device according to the present invention in a state where the device is mounted on an pair of eyeglasses, and FIG. 2 is a plane view showing a right half of the pair of eyeglasses shown in FIG. 1 with the image display device.

1 in the figures is a pair of eyeglasses. The pair of eyeglasses 1 is constituted by lenses 1a and 1b, a frame 1c that holds the lenses 1a and 1b, endpieces 1d and 1e that are integrally coupled respectively to the ends of left and right width of the frame 1c, and temples 1f and 1g foldably coupled to the endpieces 1d and 1e via hinge units $h_1$ and $h_2$.

2 is an image display device attached to the pair of eyeglasses 1. The image display device is constituted by an image display unit 2a mounted on the right side temple 1f via an mounting part and a rod-shape light guiding unit 2b (a type having a trapezoidal appearance and in which the image light is totally reflected in the light guiding path in a zig-zag manner is shown as an example), and the image display unit 2a has a built-in image display panel $2a_1$ and a circuit that drives the image display panel.

Figure 3:
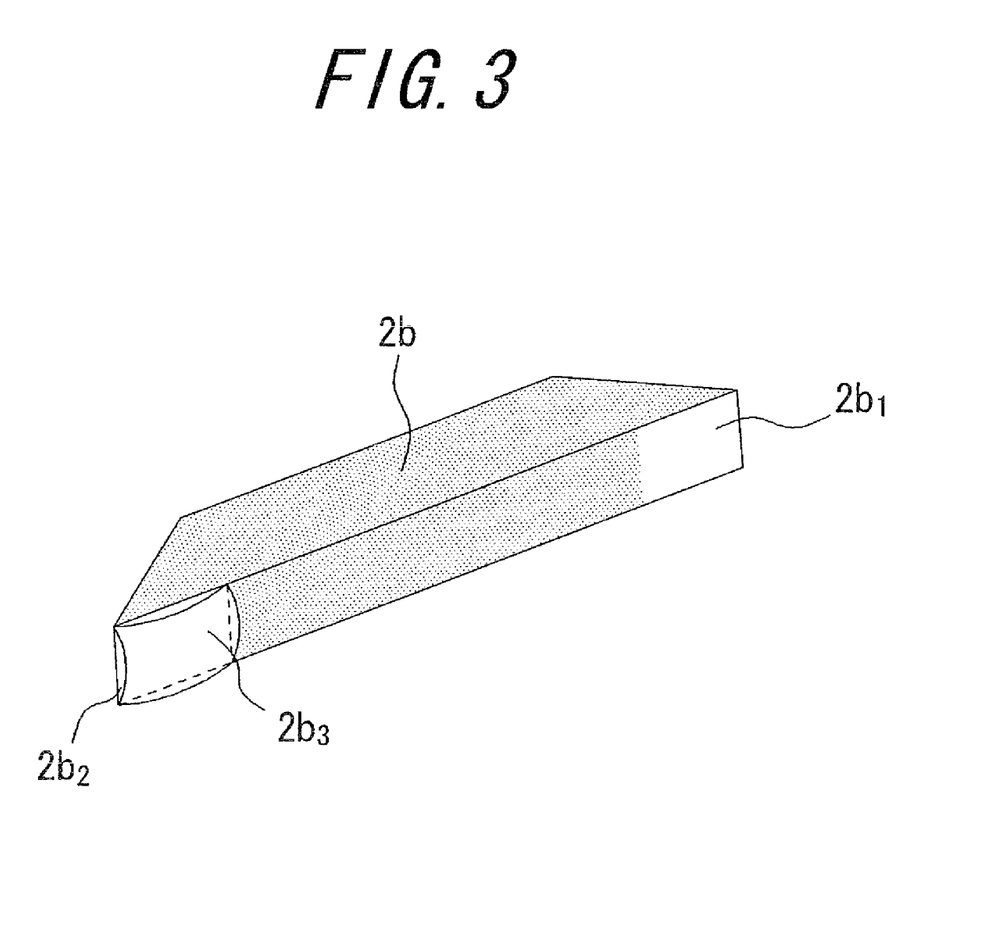
FIG. 3 is an appearance perspective view of a light guiding unit.

The light guiding unit 2b of the image display device 2 has, as shown in FIG. 3, an entering end $2b_1$ through which the image light emitted from the image display panel $2a_1$ enters after passing the lateral outer side of the eyeglass lens and an exit end $2b_2$ through which the image light that has passed through the optical path exits toward an eyeball of an observer through the eyeglass lens. The area that forms the optical path is treated with a surface finishing (coating and the like) to prevent the outside light from entering. In addition, an eyepiece optical unit $2b_3$ constituted by an eyepiece lens having curvature depending on the position of the virtual image that displays the image by the image light is disposed on the exit end $2b_2$.

The image display unit 2a is fixed and held to the temple 1f via, for example, a screw type holder 3, and the image display panel $2a_1$ embedded in the image display unit 2a is located closer to the lens 1a than the hinge $h_1$ as shown in FIGS. 1 and 2.

In the image display device having the aforementioned structure, the image light emitted from the image display panel $2a_1$ exits toward the eyeball of the observer after passing through the entering end $2b_1$, the optical path, the exit end $2b_2$ and the eyepiece optical unit $2b_3$ of the light guiding unit 2b. Here, since there is just an extremely small clearance between the image display panel $2a_1$ and the entering end $2b_1$ of the light guiding unit 2b, the light from the image display panel $2a_1$ cannot be seen from the side (around) and, in addition a compact display panel can be applied.

Figure 4:
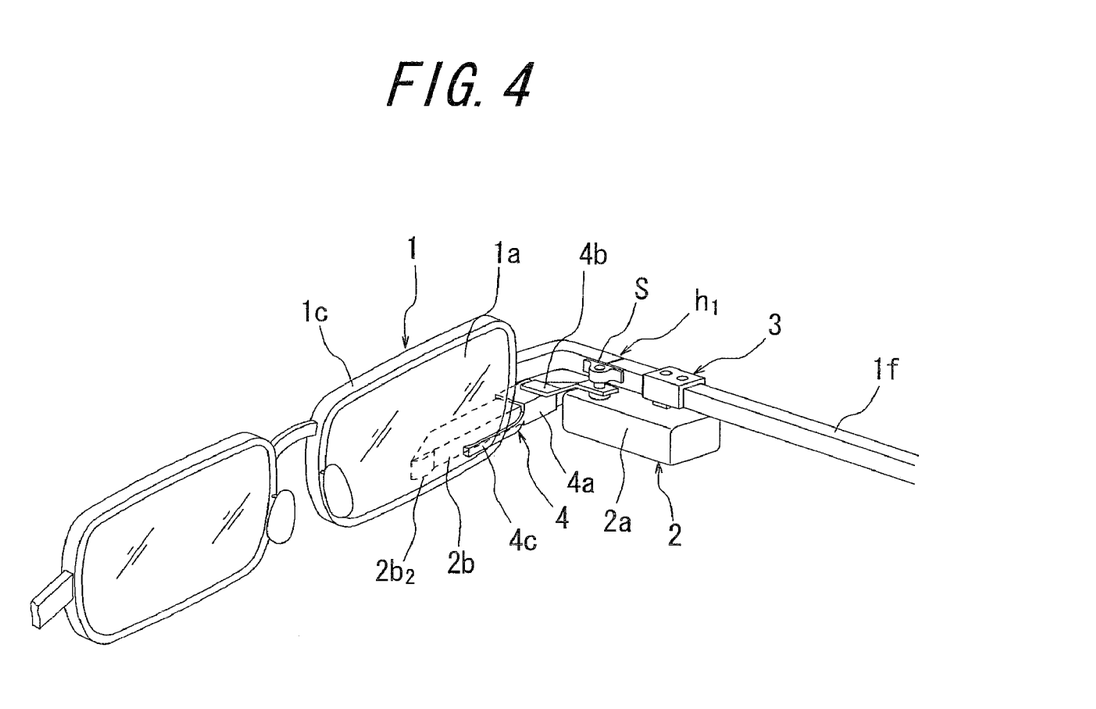
FIG. 4 is a diagram showing a back side of the pair of eyeglasses shown in FIG. 1.
Figure 5:
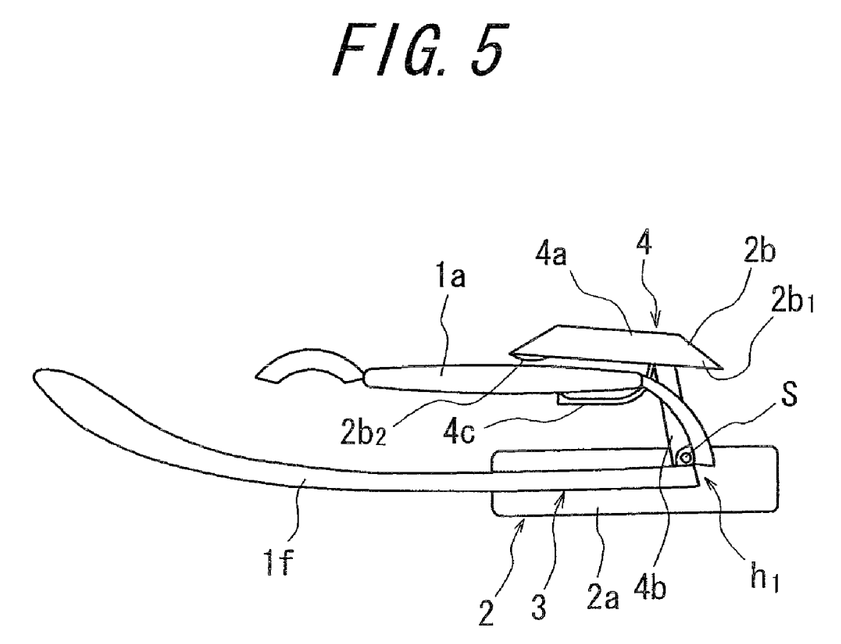
FIG. 5 is a diagram showing a state where a temple of the pair of eyeglasses shown in FIG. 1 is folded.

FIG. 4 is a diagram showing a back side of FIG. 1. A body unit 4a of a holder 4 is a box shape having a through hole through which the light guiding unit 2b is inserted and the body unit 4a is provided with an arm 4b that is rotatably linked to a vis (pivot) S of the hinge $h_1$ and an elastic tongue piece 4c that forms an area that sandwiches the lens between it and the side wall of the body unit 4a. The eyeglass lens 1a, together with the frame 1c, is sandwiched between the elastic tongue piece 4c and the side wall of the body part 4a and is clipped, thereby disposing and fixing the light guiding unit 2b on the outer surface of the lens 1a (the light guiding unit 2b is disposed so that the entering end $2b_1$ is located on the outer side of the eyeglass lens 1a and the exit end $2b_2$ is located in front of the lens 1a).

With respect to the pair of eyeglasses having a structure shown in FIGS. 1 to 4, FIG. 5 shows a state where the temple 1f is folded. In the image display device according to the present invention, the arm 4a of the holder 4 is rotatably linked to the vis S of the hinge unit $h_1$. Thus the installation attitude of the light guiding unit 2b is stably held even if the temple 1f is folded, which does not interfere with folding of the temple 1f.

Figure 6:
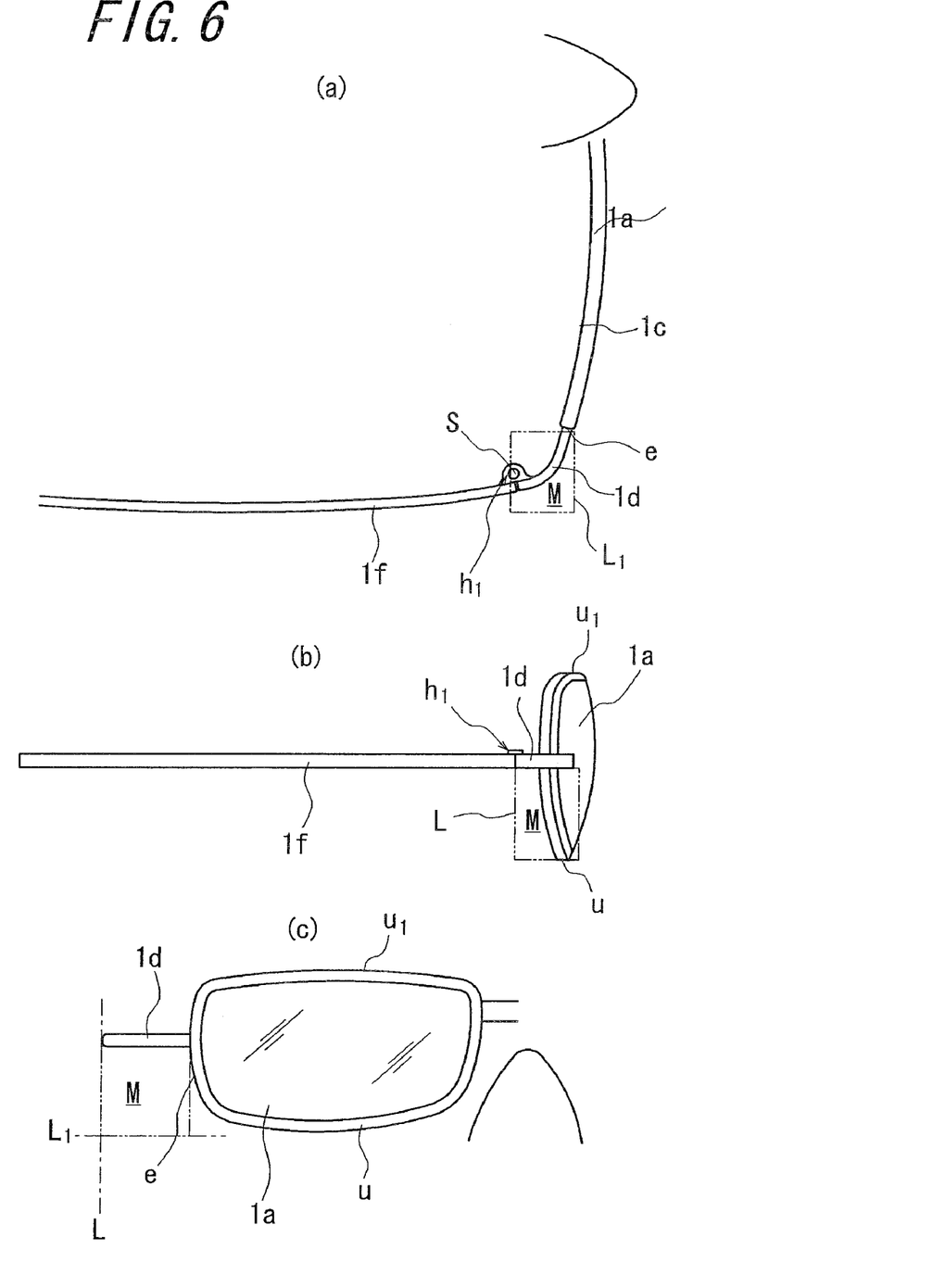
FIG. 6A is a diagram showing a preferred area where an image display panel is disposed.
FIG. 6B is a diagram showing a preferred area where an image display panel is disposed.
FIG. 6C is a diagram showing a preferred area where an image display panel is disposed.

It is preferable that the image display panel $2a_1$ embedded in the image display unit 2a is located in an area M shown in FIGS. 6A to 6C, that is, backward of the lens 1a and is surrounded by the eyeglass endpiece 1d (a member that is integrated with the eyeglass frame and connects the frame to the temple), an outer edge "e" of the eyeglass lens 1a (or the frame 1c) in the width direction, a vertical line L extending along the outer edge "e" of the eyeglass lens 1a in the width direction at the outside end (the position having the maximum convex curvature) of the temple 1*f* and a horizontal line $L_1$ connecting the vertical line L and the lowermost edge u or the uppermost edge $u_1$ of the eyeglass lens 1*a*, thereby minimizing the projection from up, bottom, left and right sides. Thus the image display device 2 will not block the view of an observer when he/she wears a pair of eyeglasses and, in addition the aesthetic look can be improved.

Figure 7:
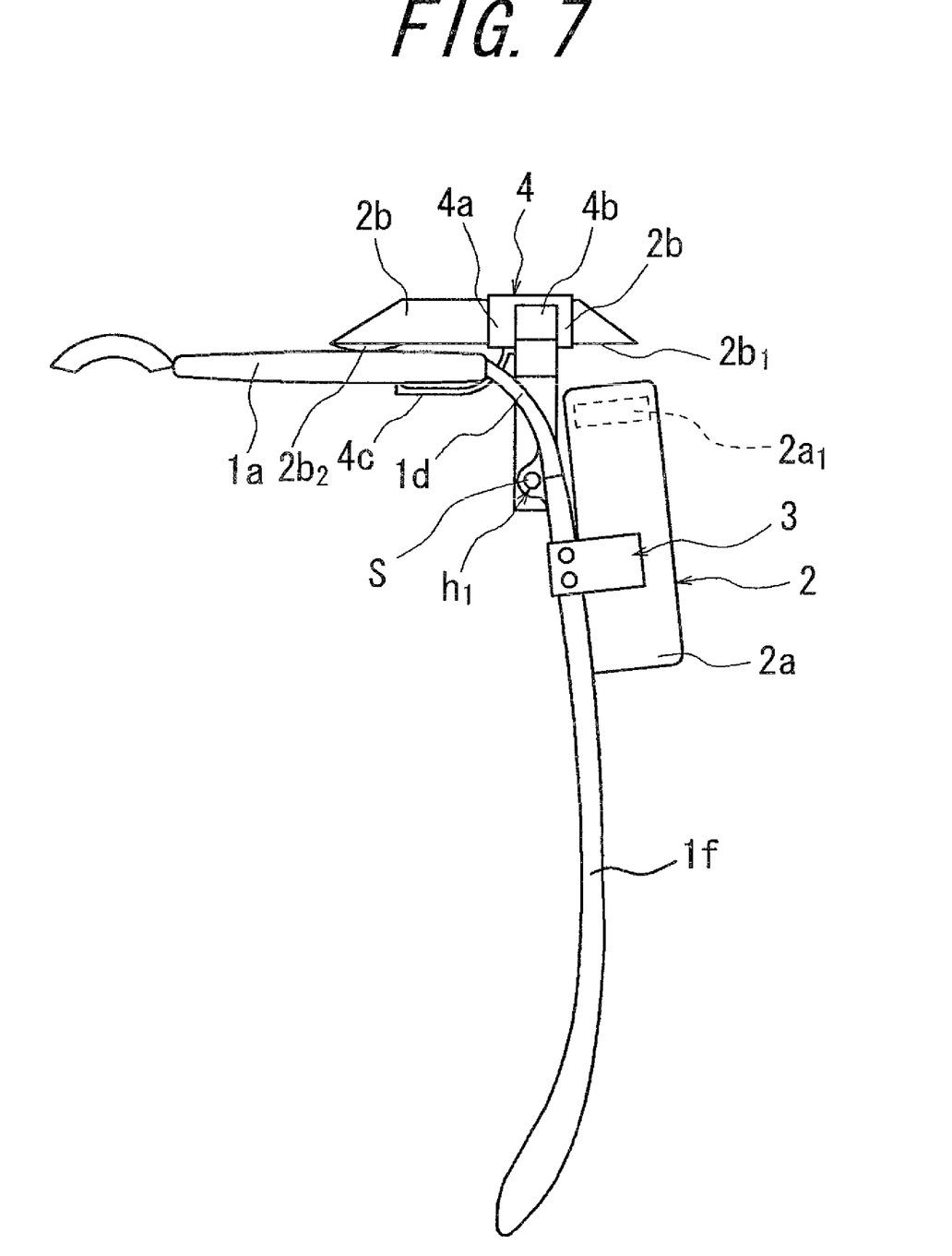
FIG. 7 is a diagram showing another example of the image display device according to the present invention.
Figure 8:
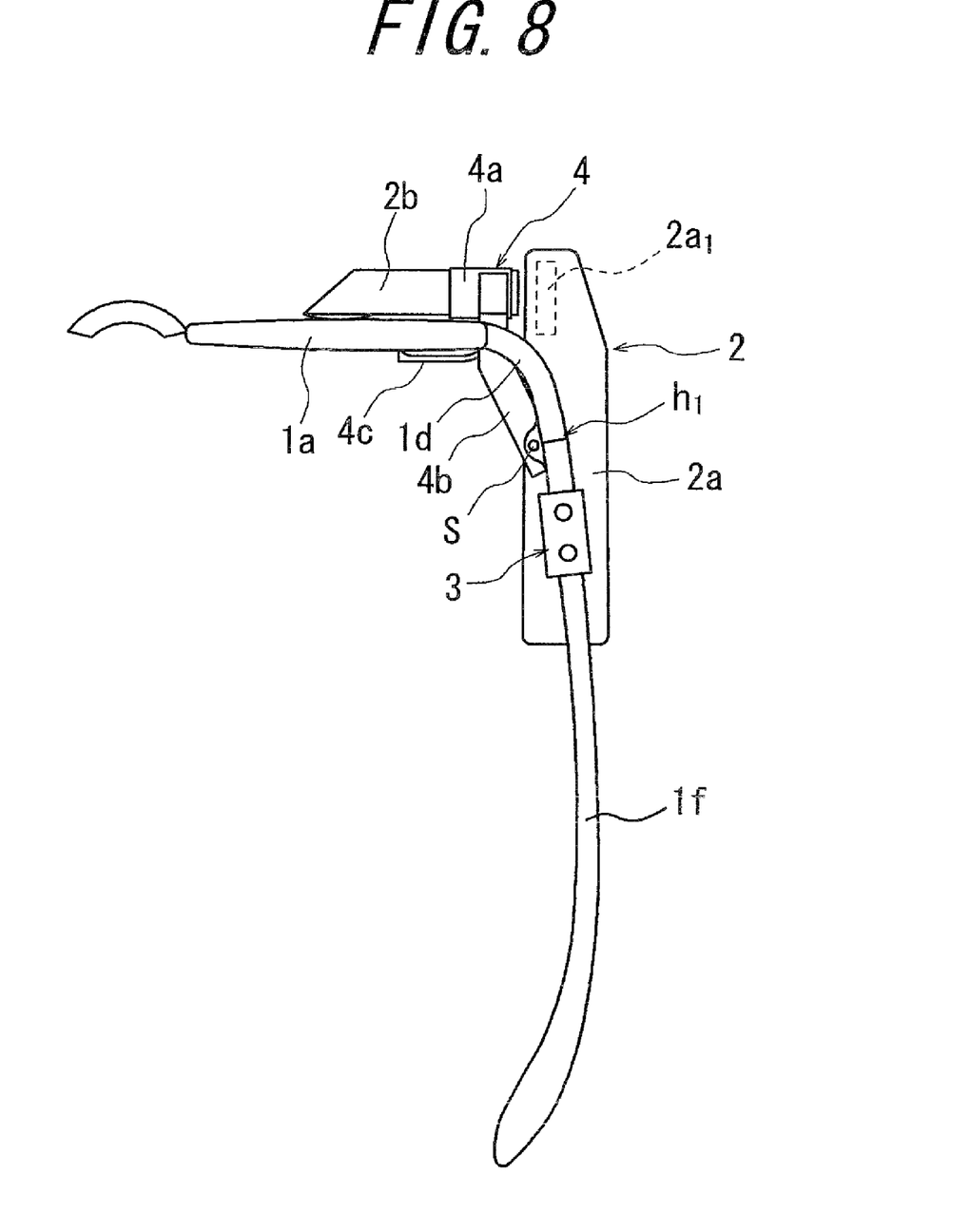
FIG. 8 is a diagram showing still another example of the image display device according to the present invention.

FIGS. 7 and 8 are diagrams showing another embodiment of the image display device 2 according to the present invention. As shown in FIG. 7, the image display unit 2*a* can be fixed so that it is located outside end of the temple 1*f*. Further, as shown in FIG. 8, the image display panel $2a_1$ embedded in the image display unit 2*a* can be located on a position which is in front of the lens 1*a* in the state where the front face thereof is directed to the eyeglass frame 1*c* and mounted across a clearance from the entering end $2b_1$ of the light guiding unit 2*b*.

In the present invention, a case where a trapezoidal light guiding unit 2*b* in which the image light that enters through the entering end $2b_1$ totally reflects in the trunk part thereof in a zig-zag manner and exits from the exit end $2b_2$ is shown. However, it is possible to apply the light guiding unit 2*b* (reflecting by one face) having a shape as shown in FIG. 8. No limitation is applied to this point.

INDUSTRIAL APPLICABILITY

An eyeglass-mounted type image display device that enables easy application to an existing pair of eyeglasses and compact housing can be provided.

What is claimed is:

1. An eyeglass-mounted type image display device comprising an image display unit having an image display panel and is attachable and detachable to and from a temple of a pair of eyeglasses and a light guiding unit through which an image light emitted from the image display panel of the image display unit exits toward an eyeball of an observer through an entering end, an optical path and an exit end, wherein the light guiding unit is constituted as a separate body that is disposed on an outer surface of an eyeglass lens separated from the image display unit.

2. The eyeglass-mounted type image display device according to claim 1, wherein the image display panel is located closer to the eyeglass lens than a hinge, which is a base point of folding of the temple.

3. The eyeglass-mounted type image display device according to claim 2, wherein a mounting area of the image display panel is located backward of the eyeglass lens and a position thereof in the up and down direction is, when viewed from front of the eyeglass, lower or upper side of an endpiece that connects the temple to an eyeglass frame, the lower limit or the upper limit thereof is a lower edge or an upper edge of the lens, and a position thereof in the width direction is from the temple to the edge of the lens in the width direction.

4. The eyeglass-mounted type image display device according to claim 1, wherein the light guiding unit is disposed so that the image light emitted from the image display panel passes lateral outer side of the eyeglass lens and is incident on the entering end and the image light that exits from the exit end transmits the eyeglass lens and is incident on the eyeball of the observer.

\* \* \* \* \*